United States Patent

[11] 3,592,113

| [72] | Inventor | Erwin von Wasielewski<br>Munich, Germany |
|---|---|---|
| [21] | Appl. No | 667,396 |
| [22] | Filed | Sept. 13, 1967 |
| [45] | Patented | July 13, 1971 |
| [73] | Assignee | AGFA-Gevaert Aktiengesellschaft<br>Leverkusen, Germany |
| [32] | Priority | Sept. 21, 1966 |
| [33] | | Germany |
| [31] | | A 53 550 |

[54] CAMERA WITH MEANS FOR INDICATING AUTOMATICALLY DETERMINED EXPOSURE TIMES
22 Claims, 8 Drawing Figs.

[52] U.S. Cl. ................................................ 95/10 C,
95/53, 250/215, 356/227
[51] Int. Cl. ...................................................... G03b 7/08,
G01j 1/46
[50] Field of Search........................................ 95/10, 10
A, 10 B, 10 C, 53; 250/206, 215; 317/124, 148.5;
315/159; 356/226, 227

[56] References Cited
UNITED STATES PATENTS
3,220,326 11/1965 Scudeer......................... 95/10 (C)

| 3,307,460 | 3/1967 | Land | 95/10 (C) |
| 3,397,629 | 8/1968 | Mori et al. | 95/10 (C) |
| 3,416,421 | 12/1968 | Biedermann et al. | 95/53 |
| 3,418,479 | 12/1968 | Schmitt | 95/10 (C) UX |

*Primary Examiner*—Samuel S. Matthews
*Assistant Examiner*—Joseph F. Peters, Jr.
*Attorney*—Michael S. Striker

ABSTRACT: A photographic camera wherein the shutter opens in response to operation of a release trigger which simultaneously completes an electronic delay circuit serving to close the shutter with a delay which is a function of the intensity of scene light. The duration of exposure time under given lighting conditions can be determined prior to or in the course of an exposure by a testing circuit which is completed by the release trigger and includes a lamp, flag or buzzer producing one or more signals to indicate the duration of exposure time, the limit of scene brightness at which an exposure can be made with camera held by hand, and/or the limit of scene brightness at which an exposure can be made with camera mounted on a fixed support. The duration of signals may be a fraction or a multiple of the corresponding exposure time. The absence of a signal can indicate satisfactory scene brightness for exposures with camera held by hand and a continuous signal can indicate that the intensity of scene light is unsatisfactory. Changes in frequency and/or duration of recurring signals can indicate different exposure times.

INVENTOR.
ERWIN v. WASIELEWSKI 3,592,113

1

CAMERA WITH MEANS FOR INDICATING AUTOMATICALLY DETERMINED EXPOSURE TIMES

CROSS-REFERENCE TO RELATED APPLICATION

This invention relates to an improvement in and to a further development of cameras disclosed in the copending application Ser. No. 546,017 filed Apr. 28, 1966 now U.S. Pat. No. 3,416,421, by Friedrich Biedermann et al. and assigned to the same assignee.

BACKGROUND OF THE INVENTION

The present invention relates to photographic cameras in general, and more particularly to improvements in cameras which are provided with means for producing signals to indicate the intensity of scene light.

It is already known to provide a camera with a lamp, bell, movable flag or shutter release blocking means to produce visible, audible or otherwise detectable signals which indicate whether the intensity of scene light is sufficient for making an exposure with hand-held camera or whether the user must install the camera on a tripod or another suitable stationary support. As a rule, such cameras comprise an electric circuit having a voltage divider which is composed of a light-sensitive resistor and a fixed resistor. A suitable flip-flop detects the voltage drop at the light-sensitive resistor and initiates the generation of a signal when the voltage drop indicates a scene brightness which is insufficient for exposures with hand-held camera. However, and since many types of cameras wherein closing of the shutter is controlled by an electric delay circuit can furnish very long exposure times in the range of one or more minutes, it is desirable to know the proper exposure time in advance so that the user of the camera can make sure that the subject (e.g., an individual posing for a still picture) will be prepared for an extended exposure time. Heretofore known cameras merely indicate whether or not the exposure can be made with hand-held camera but do not furnish any clue as to the exact exposure time.

SUMMARY OF THE INVENTION

It is an object of my invention to provide a camera which can indicate the exposure time in advance, at least within a certain range of light intensities which are satisfactory for picture taking.

Another object of the invention is to provide a camera which can indicate in advance various exposure times, whether or not an exposure can be made with hand-held camera or with camera mounted on a tripod, and whether or not an exposure can be made at all.

A further object of the invention is to provide a camera which can produce readily detectable and readily interpretable signals to indicate very short as well as very long exposure times.

An additional object of the invention is to provide a camera which can produce signals to indicate the duration of exposure time in automatic response to such manipulation of the camera which is carried out in order to make an exposure.

A concomitant object of the invention is to provide a camera wherein the exposure time-indicating means can be employed to determine the condition of the energy source for the electric circuitry of the camera.

Still another object of the invention is to provide a camera wherein different exposure times can be indicated by the absence of signals, by recurrent signals of varying frequency and/or duration, and/or as continuous signals.

An ancillary object of the invention is to provide a camera wherein the circuit for automatic selection of exposure values may but need not include a galvanometer.

Another object of the invention is to provide a camera wherein relatively short signals can indicate long exposure times and vice versa.

2

Briefly outlined, the invention is embodied in a photographic camera which comprises shutter means movable between open and closed positions to provide a range of exposure times, release means operative to open the shutter means, an electric delay circuit for effecting closing of the shutter means with a variable delay following operation of release means and preferably as a function of the intensity of scene light, and indicating means including signal-generating means for producing signals indicating the length of exposure time in at least a portion of the aforementioned range and as a function of the intensity of scene light.

The signal-generating means may include one or more lamps, flags, buzzers or analogous devices which produce visible, audible or otherwise detectable signals that can be heard or observed by looking through the viewfinder or at another part of the camera. The duration of signals may equal the length of exposure time for a certain scene brightness or their duration may be a fraction or a multiple of the exposure time. Also, a series of recurring signals may indicate a range of exposure times and such signals can recur at different frequencies to thereby indicate different exposure times. Also, the duration of recurring signals may vary to thus indicate changes in exposure time.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
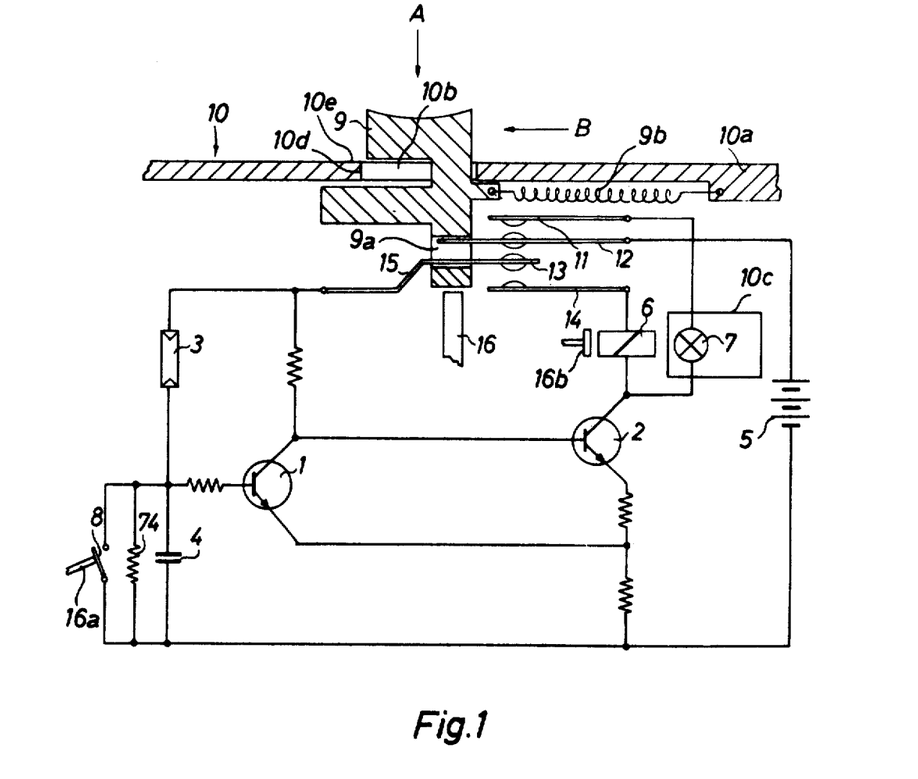
FIG. 1 is a fragmentary vertical sectional view of a still camera which embodies one form of my invention and can produce a visible signal whose duration corresponds to the length of exposure time and wherein the testing circuit which includes the signal generating means is integrated into the delay circuit for the shutter.

FIG. 1 illustrates a portion of a still camera having a housing or body 10 including a top wall 10a provided with an opening 10b for a shutter release trigger 9 which also serves as the actuating means of an indicating means provided in the camera to determine the length of exposure time. The camera is of the type wherein the exposure time is a function of the intensity of scene light, i.e., the exposure time is furnished automatically in dependency on scene brightness. The electronic delay circuit of the camera causes the shutter to close with a variable delay following depression of the release trigger 9 in the direction indicated by an arrow A. This delay circuit is integrated into a testing circuit of the indicating means and the testing circuit is energized in response to movement of the release trigger 9 in the direction indicated by an arrow B. The two circuits employ several common component parts, and the testing circuit includes a signal-generating lamp 7 which lights up during testing to indicate the length of the exposure time. The shutter of the camera can furnish a range of exposure times.

The delay circuit includes a light-sensitive receiver 3 (preferably a resistor), a flip-flop including two transistors 1 and 2, an exposure time determining capacitor 4 whose charge is detected by the flip-flop, a battery 5 or another suitable source of electrical energy, an electromagnet 6 which constitutes a means for effecting closing of the shutter, and a customary short-circuiting switch 8 in parallel with the capacitor 4 and controlled by the shutter to initiate charging of the capacitor. A master switch includes four tonguelike elastic contacts 11, 12, 13, 14. The contact 13 has an inclined portion 15 and extends through an aperture or cutout 9a of the release trigger 9. This cutout 9a also receives the free end of the contact 12. When the trigger 9 is depressed in the direction indicated by arrow A, the contact 12 bears against the contact 13 and causes the latter to bear against the contact 14 to thereby complete the delay circuit. The contacts 12—14 then constitute a closed two-way switch. On further depression in the direction indicated by arrow A, the trigger 9 engages a portion 16 of the shutter and causes the latter to open.

The operation of the camera to make an exposure is as follows:

An unexposed film frame (not shown) is held in registry with the optical system and the shutter is closed. The shutter then maintains the switch 8 in closed position or allows this switch to close. The user depresses the release trigger 9 (arrow A) whereby the contact 12 engages with the contact 13 and the latter engages with the contact 14. The delay circuit is energized and, as the trigger 9 continues to move downwardly, it opens the shutter by depressing the shutter portion 16 whereby a second shutter portion 16a simultaneously opens the switch 8. The capacitor 4 is being charged. When the charging of capacitor 4 reaches a predetermined stage, the transistor 1 begins to conduct current and the transistor 2 begins to block the flow of current. This deenergizes the electromagnet 6 which releases a portion 16b of the shutter so that the shutter closes to terminate the exposure. The shutter portion 16b constitutes the armature of the electromagnet 6.

In order to determine the length of exposure time in advance, the camera of FIG. 1 is operated as follows:

The user shifts the release trigger 9 in the direction indicated by arrow B (against the opposition of a return spring 9b) whereby the trigger bears against the inclined portion 15 of the contact 13 and causes the latter to bear against the contact 12 which, in turn, bears against the contact 11 to energize the testing circuit. The capacitor 4 begins to accumulate a charge without delay because the trigger opens the switch 8 on closing of the switch 11—13 but the shutter remains closed because the trigger does not depress the shutter portion 16. Since the contact 14 remains disengaged from the contact 13, the electromagnet 6 remains deenergized and is replaced by the signal generating lamp 7 which lights up and remains lighted until the charge of the capacitor 4 reaches a value which renders the transistor 1 conductive and transistor 2 nonconductive. In other words, the length of the interval during which the lamp 7 produces a visible signal corresponds to the length of the interval during which the electromagnet 6 is energized in response to depression of the release trigger 9 (arrow A) and the signal indicates the length of the exposure time.

In order to insure that the capacitor 4 discharges completely prior to start of a test, the testing circuit preferably includes a resistor 74 in parallel with the capacitor. The ohmic resistance of the resistor 74 is so high that its influence on charging of the capacitor 4 through the light-sensitive receiver 3 is negligible. The receiver 3 is exposed to scene light and the lamp 7 is preferably installed in the viewfinder 10c.

It is clear that the lamp 7 can be replaced by a buzzer, bell or another device which can produce an audible signal for a period corresponding to the length of exposure time. Also, the trigger 9 can be replaced by two triggers one of which moves the contacts 12—14 against each other and depresses the shutter portion 16 when the user wishes to make an exposure and the other of which moves the contacts 11—13 against each other but does not depress the shutter portion 16 when the user wishes to ascertain the exposure time prior to making of an exposure.

An important advantage of the just described embodiment is that the testing circuit is very simple because it employs several component parts of the delay circuit and because a single-actuating member (trigger 9) suffices to energize both circuits independently of each other.

The top wall 10a of the housing 10 has a first guide surface 10d which prevents movement of the release trigger 9 in the direction indicated by arrow B after the trigger leaves the illustrated starting position and moves in the direction indicated by arrow A. A second guide surface 10e of the top wall 10a prevents movement of trigger 9 in the direction of arrow A after the trigger leaves its starting position by moving in the direction of arrow B. The two directions are preferably but need not be normal to each other. The guide surfaces 10d, 10e insure that the testing circuit cannot be energized when the trigger 9 is operated to open the shutter, and that the trigger cannot open the shutter when the user wishes to obtain advance information as to the length of exposure time at a certain scene brightness.

Figure 2:
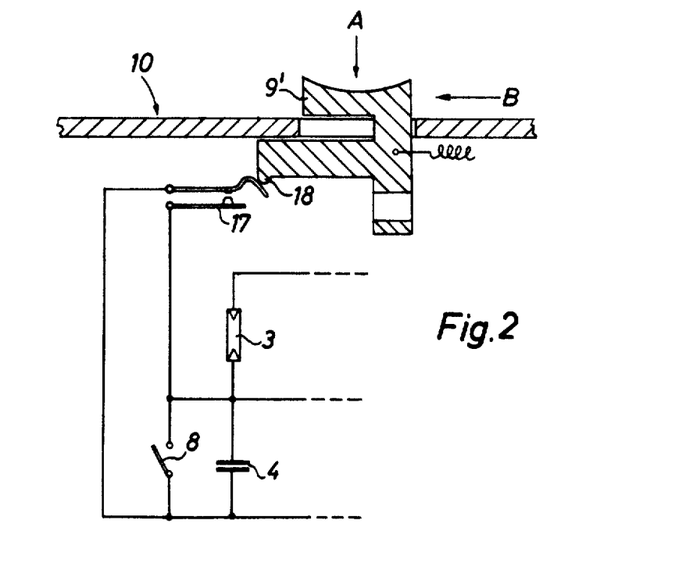
FIG. 2 illustrates a portion of a modified testing circuit for use in the camera of FIG. 1.

FIG. 2 illustrates a slight modification of the testing circuit shown in FIG. 1. The release trigger 9' has a projection or trip 18 which closes a normally open switch 17 in the testing circuit when the user moves the trigger in the direction indicated by arrow B. The switch 17 closes immediately after the release trigger 9' leaves its normal position but opens again as the trigger continues to move in the direction indicated by arrow B. This insures that the capacitor 4 is fully discharged before the actual test begins, i.e., before the trigger 9' causes the contacts 11—13 of the master switch to engage with each other in a manner as shown in FIG. 1. The switch 17 is particularly useful if the operator decides to make a series of tests by repeatedly shifting the trigger 9' at short intervals in the direction indicated by arrow B. The switch 17 is connected in parallel with the interrupter switch 8.

Figure 3:
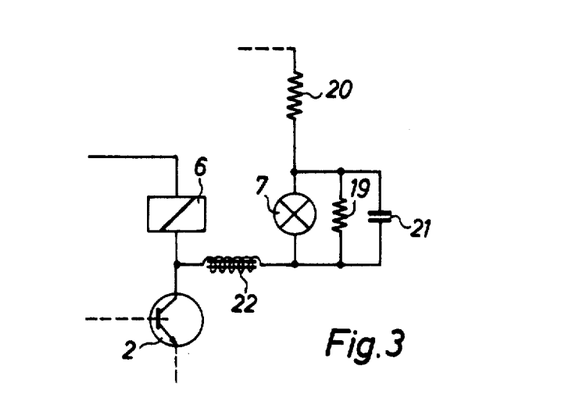
FIG. 3 illustrates a portion of a further testing circuit for use in the camera of FIG. 1.

FIG. 3 illustrates another modification of the structure shown in FIG. 1. The signal generating lamp 7 is connected in series and in parallel with auxiliary electrical elements including two resistors 19, 20, a capacitor 21 and an inductance 22. These auxiliary elements cause the testing circuit to allow the lamp 7 to light up briefly when the exposure time is too long for making exposures with hand-held camera, i.e., when the exposure time is the shortest time which requires the use of a tripod. The lamp signal is suppressed at a predetermined range of light intensities, namely, when the exposure time is short enough to permit making an exposure with hand-held camera. In other words, if the lamp 7 generates a signal, the user knows that he or she should resort to a tripod. It is clear, however, that the lamp 7 of FIG. 3 and the auxiliary elements 19—22 can be provided in addition to the parts shown in FIG. 1, i.e., that the camera can utilize two lamps one of which lights up at all times and indicates the exact duration of the exposure time and the other of which lights up only when the exposure time is too long for making exposures with hand-held camera.

In each of the heretofore described embodiments of my invention, the signal-generating lamp 7 replaces the electromagnet 6 when the user decides to determine the exposure time in advance. Thus, the basic design of the delay circuit is changed very little. It is further clear that the testing and/or delay circuit may employ other electrical components and/or additional electrical components to provide a practical electric circuitry for use in photographic cameras. Moreover, the lamp 7 can be installed in another part of the camera, i.e., not necessarily in the viewfinder 10c. For example, the housing 10 of FIG. 1 can be provided with a separate window located in front of the lamp 7.

Figure 4:
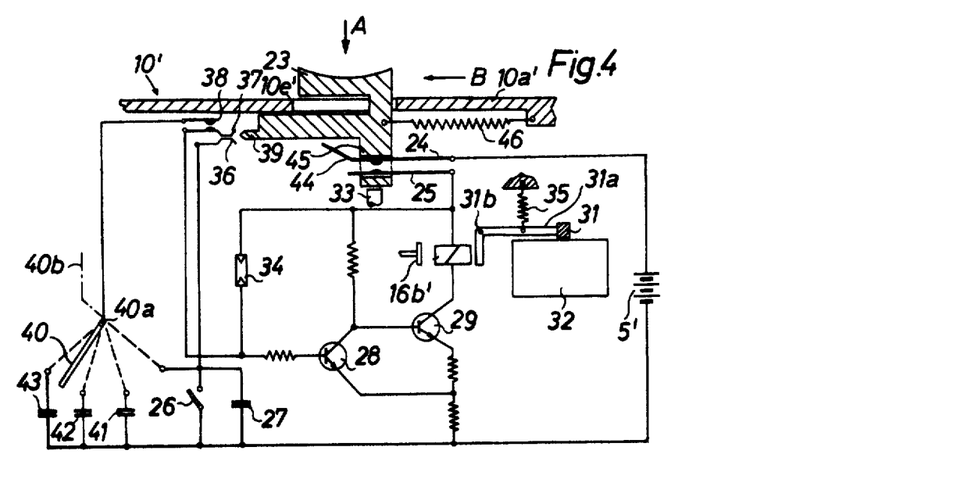
FIG. 4 is a fragmentary vertical sectional view of a second camera wherein the testing circuit can produce signals, which are as long as, shorter or longer than the exposure time.

FIG. 4 illustrates a further photographic camera which is designed with a view to determine the exposure time for a given light intensity in advance of actual exposure and in such a way that, when the exposure time is very long, the user can determine such long exposure time without necessitating a wait of one or more minutes. This embodiment solves the problem which arises if, under certain circumstances, the exposure time is very long, for example, in the range of one, two or more minutes. Thus, and if the user knows in advance that the exposure time will be quite long, he or she can make sure that the subject will remain still or that the subject will remain in desired position. On the other hand, it is impractical to wait for one or more minutes in order to determine the exact length of exposure time. This is solved by providing the testing circuit with proportioning means which can determine the length of signals in such a way that relatively short signals indicate much longer exposure times. Furthermore, the proportioning means of the camera shown in FIG. 4 includes means for extending or lengthening the signals which indicate relatively short exposure tines so that the user is in a position to discriminate between two relatively short signals, for example, between signals which indicate exposure times in the range of one-fifth and one-thirtieth of a second.

Basically, the testing circuit of FIG. 4 can accomplish the just stated objects by employing proportioning capacitors whose capacities are different from that of the capacitor which is used in the delay circuit for the shutter. Thus, a proportioning capacitor having a capacity which equals one-tenth of the capacity of the exposure time determining capacitor in the delay circuit will reduce the length of a signal to one-tenth of the exposure time, a proportioning capacitor whose capacity is 1 percent of the capacity of the exposure time determining capacitor in the delay circuit will reduce the length of a signal to one-hendredth of the exposure time, and a proportioning capacitor whose capacity is 10 times the capacity of the exposure time determining capacitor in the delay circuit will lengthen or extend the signal to 10 times the exposure time. A practical ratio in connection with determination of relatively long exposure times is 1-to-60, i.e., a signal of 1 second duration will indicate an exposure time of 1 minute.

The testing circuit can employ a proportioning capacitor whose capacity exceeds that of the exposure time determining capacitor in the delay circuit when the signal indicating the duration of exposure time is a mechanical signal, for example, a signal constituted by movement of a flag into the viewfinder in response to energization of an electromagnet. The inertia of a mechanically movable flag is so high that the flag cannot properly indicate short exposure times to an inexperienced operator. However, if the flag is visible for 1 second and if this indicates that the exposure time is one-sixtieth of a second, even an inexperienced operator can readily judge the exposure time especially if the testing circuit comprises several proportioning capacitors each of which has a different capacitance and each of which can be connected in testing circuit to indicate a particular exposure time.

The camera of FIG. 4 can be further provided with a device which tests the condition of the battery 5'. The circuitry is such that the delay circuit will operate irrespective of which of several proportioning capacitors is connected in the testing circuit, i.e., the operator need not adjust the testing circuit in order to make a proper exposure so that a camera using such circuitry can be manipulated by beginners as well as by advanced photographers.

The electromagnet 30 of the circuit shown in FIG. 4 performs the function of the aforedescribed electromagnet 6 and additionally comprises an armature in the form of a lever 31a which carries a signal generating flag 31 and is biased by a spring 35 which tends to keep the flag 31 away from registry with the viewfinder 32. The lever 31a is fulcrumed in the camera housing 10', as at 31b. When the electromagnet 30 is energized, it attracts the left-hand arm of the lever 31a whereby the flag 31 moves downwardly and is visible to a person looking through the viewfinder 32. In this way, the operator knows that a satisfactory exposure can be made by resorting to a tripod. The flag 31 can be installed adjacent to a separate window in the housing 10', i.e., it need not be placed next to the viewfinder 32.

Furthermore, the flag 31 can be omitted altogether if the movement of lever 319 in response to energization and deenergization of electromagnet 30 produces a noise which is readily detectable. Thus, the operator can determine the exposure time by judging the length of intervals between successive noises which are respectively produced on energization and deenergization of the electromagnet 30. Moreover, the armature 31a can be omitted altogether if the armature 16b' of the electromagnet 30 produces sufficient noise to indicate the duration of exposure time or if the armature 16b' carries a flag that is visible in the viewfinder 32 or elsewhere when the electromagnet 30 is energized. The armature 16b' forms part of the shutter and is released by the electromagnet 30 when the latter is deenergized whereby the shutter is free to close and to terminate the exposure. Energization of the electromagnet 30 during testing does not affect the position of the shutter because the shutter does not open in response to completion of the testing circuit.

The camera of FIG. 4 further comprises a release trigger 23 which is biased by a return spring 46 and is movable in directions indicated by arrows A and B. The left-hand portion of the trigger 23 carries a wedgelike trip 39 of insulating material which can open a normally closed switch including contacts 36, 37 and which thereby closes a second switch including the contact 37 and a further contact 38 of the testing circuit. The contact 38 can be connected in series with one of several proportioning capacitors 41, 42, 43 in response to appropriate adjustment of a current-conducting selector arm 40 which is pivotable at 40a and preferably carries a suitable index cooperating with a graduated scale on the housing 10'. The exposure time determining capacitor 27 is installed in the delay circuit and can be charged in response to opening of a switch 26 corresponding to the switch 8 of FIG. 1. The selector arm 40 is movable to four positions including a starting or idle position "1" in which the contact 38 is connected with the exposure time determining capacitor 27, and three additional positions in which the contact 38 is respectively connected with proportioning capacitors 41, 42, 43. The capacity of proportioning capacitors 41, 42, 43 respectively corresponds to one-tenth, one-hundredth and 10 times the capacity of the exposure time determining capacitor 27. The flip-flop of the delay circuit includes two transistors 28, 29 and the delay circuit further includes a customary light-sensitive receiver 34.

The trigger 23 can close a master switch including contacts 24, 25 to thereby complete the delay circuit. The contact 24 has an inclined portion 44 which is engaged by a shoulder 45 of the trigger 23 when the latter is moved in the direction indicated by arrow B.

The operation is as follows:

In order to make an exposure, the user depresses the release trigger 23 in the direction indicated by arrow A whereby the contact 24 moves against the contact 25 and energizes the delay circuit. The short-circuiting switch 26 for the capacitor 27 is closed, the transistor 28 blocks and the transistor 29 permits the flow of current. The electromagnet 30 is energized and causes the armature 31a to move the flag 31 into registry with the viewfinder 32. As the trigger 23 continues to move downwardly, it displaces the shutter portion 33 to open the shutter. The switch 26 opens in response to opening of the shutter and the charging of capacitor 27 begins. The period required for charging of capacitor 27 to a predetermined extent depends on the intensity of scene light, i.e., on the resistance of light-sensitive receiver 34. When the capacitor 27 is charged, the transistor 28 becomes conductive and the transistor 29 blocks the flow of current to deenergize the electromagnet 30. The spring 35 removes the flag 31 from the viewfinder 32 and the electromagnet 30 releases the armature 16b' which causes the shutter to close. When the user's hand releases the trigger 23, the contact 24 moves away from contact 25 and the delay circuit opens.

In order to determine the exposure time in advance, the operator will proceed as follows:

The release trigger 23 is shifted in the direction indicated by arrow B whereby the insulating trip 39 separates the contacts 36, 37 and closes the switch 37, 38. The capacitor 27 and switch 26 are disconnected from the testing circuit unless the selector arm 40 is held in the idle position "1." If the selector arm connects the contact 38 with one of the proportioning capacitors 41—43, the exposure time determining capacitor 27 is disconnected from the testing circuit and does not participate in determination of exposure time.

As the release trigger 23 continues to move in the direction indicated by arrow B, the shoulder 45 closes the master switch 24, 25 by bearing against the inclined portion 44 of the contact 24. The testing circuit is energized and the electromagnet 30 attracts the armature 31a to move the flag 31 into the viewfinder 32. The period during which the flag 31 remains visible is determined by the position of the selector arm 40. Thus, if the arm 40 connects the contact 38 with the proportioning capacitor 42 and the flag 31 remains visible for 1 second, the user knows that the exposure time will be nearly 2 minutes. On the other hand, if the arm 40 connects the contact 38 with the proportioning capacitor 43 and the flag 31 remains visible for 2 seconds, the operator knows that the exposure time is one-fifth of a second. The trigger 23 cannot cause opening of the shutter during testing because it does not engage the shutter portion 33. The guide surface 10e' of the top wall 10a' prevents downward movement of the trigger 23 after the latter is caused to leave its starting position and to move in the direction of arrow B. When the trigger 23 is released, the spring 46 contracts and the trigger returns to its starting position to open the switch 37, 38, to allow closing of the switch 36, 37 and to also allow opening of the master switch 24, 25. The camera is then ready to make an exposure irrespective of the position of the selector arm 40 because the contact 38 is disconnected from the contact 37. The structure of FIG. 4 is preferably provided with a resetting device (indicated by a phantom line 40b) which automatically returns the selector arm 40 to idle position "1" when the release trigger 23 is operated in a sense (arrow A) to open the shutter.

In accordance with a further embodiment of my invention, the testing circuit can include a signal-generating device which produces recurring video or audio signals. For example, a signal-generating lamp in the testing circuit can light up at a predetermined frequency to thereby furnish a first type of signal which indicates that the exposure must be made with camera mounted on a tripod. If the lamp does not light up at all, the operator knows that the exposure time is short enough for exposures with hand-held camera, and if the lamp lights up and remains lighted, the user knows that the intensity of scene light is insufficient for a satisfactory exposure, i.e., that the automatic exposure control cannot furnish a satisfactory exposure time. Furthermore, the frequency at which the signal recurs can be varied to indicate different exposure times for exposures with tripod-mounted camera.

Figure 5:
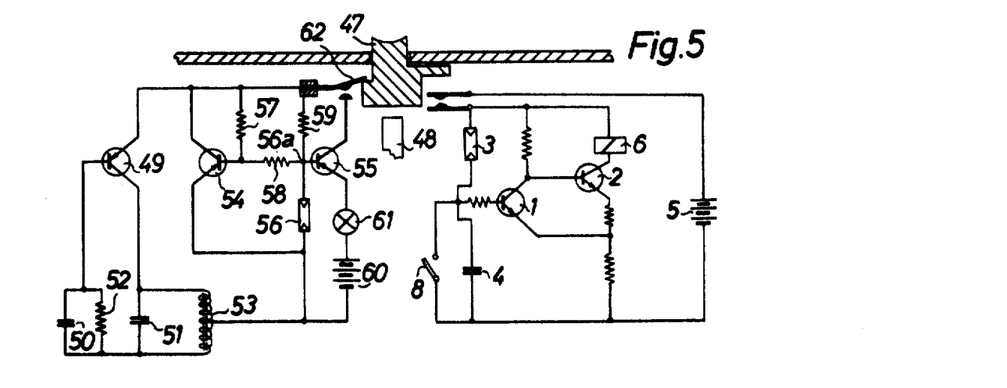
FIG. 5 illustrates a portion of a further camera which can produce recurrent signals to indicate a certain range of exposure times.

The just mentioned embodiment of my invention is illustrated in FIG. 5 which shows an oscillator circuit forming part of the testing circuit. The oscillator circuit of FIG. 5 is designed to provide a series of visible signals which recur at the same frequency when the exposure time is too long for exposures with hand-held camera. At the present time, I prefer to design the oscillator circuit in such a way that it furnishes signals at a frequency of no more than 20 signals per second but not less than one-fifth of a signal per second. For example, the frequency may be 2—10 signals per second.

The right-hand part of FIG. 5 illustrates a delay circuit which effects closing of the shutter with a delay which is a function of the intensity of scene light. This delay circuit is similar to the delay circuit of FIG. 1 and operates in the same way. The left-hand part of FIG. 5 shows the testing circuit which includes a signal-generating lamp 61 and a separate source 60 of electrical energy; however, it is clear that the testing circuit may receive current from the energy source in the delay circuit. In contrast to operation of the camera shown in FIG. 1, the camera of FIG. 5 employs a release trigger 47 which is movable in a single direction, i.e., up and down, but is capable of completing both circuits in such a way that the testing circuit is completed ahead of the delay circuit. When moving from the illustrated starting position to a second position in which it opens the shutter and energizes the delay circuit, the trigger 47 moves through an intermediate position in which it closes the master switch 62 of the testing circuit. In order to let the operator know that the testing circuit is completed but that the release trigger 47 has not, as yet, completed the delay circuit, the camera preferably comprises a yieldable abutment which opposes further movement of the trigger 47 beyond intermediate position upon completion of the testing circuit. Such abutment may be constituted by the shutter portion 48 which extends into the path of movement of the release trigger 47 and is engaged by the latter when the testing circuit is completed but the delay circuit is still open. However, it is equally within the purview of my invention to provide an independent abutment for the release trigger 47 and/or to provide a separate actuating member which completes the testing circuit independently of the release trigger 47 for the delay circuit.

In the embodiment of FIG. 5, the testing circuit remains energized until after the operator releases the trigger 47. Such mode of operation renders it possible to utilize a relatively simple electric circuitry, especially if both circuits employ a common source of electrical energy.

The oscillator circuit includes a transistor 49, capacitors 50 and 51, a resistor 52 and an inductance 53 with a centrally located tap. Two auxiliary circuits of the testing circuit include transistors 54 and 55, a light-sensitive receiver 56 and resistors 57, 58, 59. These auxiliary circuits are effective to respectively indicate that the camera can be used by holding it in hand and to indicate such intensity of scene light which is too weak for satisfactory exposures. The testing circuit further includes the aforementioned master switch 62 which tends to close automatically, the aforementioned signal lamp 61 and the aforementioned energy source 60. The exact construction of the oscillator circuit 49—53 forms no part of the present invention and it is clear that other types of oscillator circuits can be used with equal advantage.

The oscillator circuit 49—53, the two auxiliary circuits and the receiver 56 constitute a control means in the testing circuit whose function is to effect the generation of a sequence of recurrent signals to indicate a certain range of exposure times. The oscillator circuit 49—53 is in series with the signal-generating lamp 61 and the receiver 56 is common to both auxiliary circuits. This receiver 56 constitutes with the resistor 59 a voltage divider in the first auxiliary circuit and the common point 56a of this voltage divider is connected with the base of the transistor 55 in the first auxiliary circuit. The emitter-collector stage of the transistor 55 is connected with the energy source 60 and the resistor 59 is connected to the poles of this energy source.

The characteristic of the second auxiliary circuit is different from that of the first auxiliary circuit. This second auxiliary circuit includes the transistor 54 whose emitter-collector stage is in parallel with the oscillator circuit 49—53 and whose base is connected to the common point of a second voltage divider including the resistors 57, 58 and the light-sensitive receiver 56.

The operation is as follows:

The operator depresses the trigger 47 whereby the trigger permits automatic closing of the master switch 62. If the light-sensitive resistor 56 is exposed to scene light of high intensity, the transistors 55, 56 are blocked and the circuit of the signal generating lamp 61 is not completed so that the latter does not furnish any signals. This indicates to the user that the intensity of scene light suffices to make an exposure with hand-held camera.

If the intensity of scene light is weaker, the transistor 55 conducts current and the oscillator circuit 49—53 begins to oscillate noticeably whereby the lamp 61 lights up at the frequency of pulses. The user knows that the exposure must be made with camera mounted on a tripod or the like because the exposure time is too long to permit satisfactory exposures with hand-held camera.

If the intensity of scene light is still weaker, the resistance of the light-sensitive element 56 increases still further and the transistor 54 also conducts current. The current then bypasses the oscillator circuit and the lamp 61 receives a continuous supply of current. The resulting continuous signal indicates to the user that the intensity of scene light is insufficient for a satisfactory exposure. The lamp 61 remains on until the operator releases the trigger 47 so that the master switch 62 opens.

Figure 6:
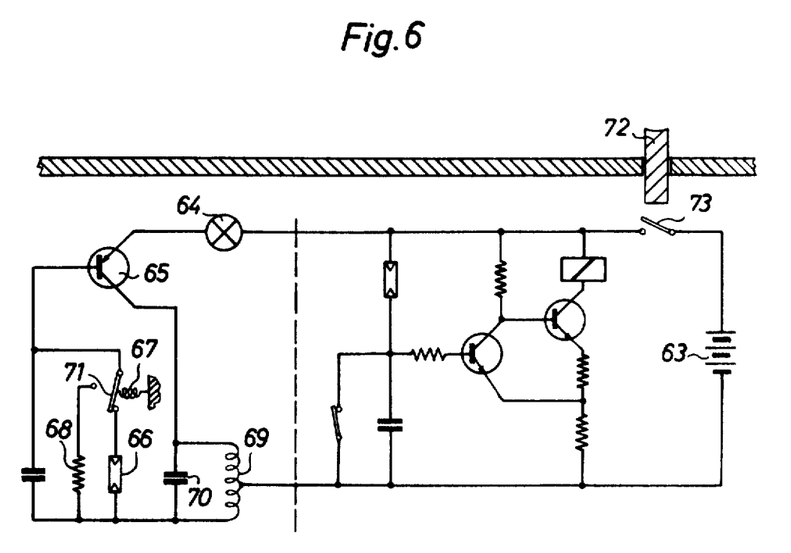
FIG. 6 illustrates a portion of a camera which constitutes a modification of the camera shown in FIG. 5 and is also capable of producing recurrent signals.

FIG. 6 illustrates a modification of the just described camera. The circuitry of FIG. 6 is somewhat simpler and the testing circuit is capable of furnishing recurring signals at different frequencies to thereby indicate the length of exposure time not only in terms of whether an exposure can be made by hand-held camera or with camera mounted on a tripod but also as regards the actual length of exposure time during an exposure with tripod. Furthermore, the circuitry of FIG. 6 includes means for testing the common source 63 of electrical energy. The condition of source 63 is important because it affects the exposure time by supplying current to the delay circuit. For the sake of clarity, the two main circuits of FIG. 6 are separated by a vertical broken line. The right-hand part is the delay circuit and the left-hand part is the testing circuit. It will be seen that the delay circuit is similar to that which was described in connection with FIG. 1. The testing circuit includes a signal generating lamp 64 and control means including an oscillator circuit having an inductance 69 with a central tap and a capacitor 70. The static voltage at the base of the transistor 65 in the oscillator circuit depends on the resistance of a light-sensitive receiver 66 which is exposed to scene light. A fixed resistor 68 can be connected with the transistor 65 against the opposition of a spring 67 when the operator wishes to test the charge of the battery 63. The spring 67 normally maintains a switchover device 71 in a position in which the latter connects the transistor 65 with the light-sensitive receiver 66.

The structure shown in FIG. 6 is operated as follows:

When the operator depresses the shutter release trigger 72, the latter closes a master switch 73 which is common to the two main circuits whereby the switch 73 energizes both main circuits. The oscillator circuit of the control means in the testing circuit begins to oscillate and the lamp 64 begins to produce a sequence of visible signals. The frequency of such signals is determined basically by the element 69, 70 of the oscillator circuit. The resistance of the light-sensitive receiver 66 determines static voltage at the base of the transistor 65 and thus the conductivity of transistor and the duration of signals produced by lamp 64 during each oscillation of the oscillator circuit. The exact time of ignition and the duration of signals produced by the lamp 64 depend on the intensity of scene light. By resorting to conventional electrical components (resistors, capacitors and inductances), the testing circuit can be dimensioned in such a way that the lamp signal is suppressed when the intensity of scene light is sufficiently high for exposures with hand-held camera, that the duration of recurring signals produced by lamp 64 increases with decreasing intensity of scene light in such range of intensities which require exposures with tripod-mounted camera, and that the lamp 64 remains lighted when the intensity of scene light is below a value which warrants an exposure. The limit at which the lamp 64 remains lighted is preferably the limit at which the automatic exposure time-determining system of the camera becomes inoperative. Alternatively, the limit can be that at which a mathematically correct proportional exposure of film becomes impossible due to the so-called reciprocity failure (also known as Schwarzschild effect).

In order to test the battery 63, the operator simply moves the switchover device 71 against the opposition of the spring 67 to connect the fixed resistor 68 in circuit with the transistor 65. If the lamp 64 produces a series of signals or a continuous signal (depending on the resistance of the resistor 68), the user knows that the battery voltage is too low.

The system of FIG. 6 can be employed with equal advantage to detect changes in intensity of scene light during an exposure. Since the testing circuit is completed in automatic response to closing of the master switch 73, the user can detect changes in frequency at which the lamp 64 produces signals, and such changes in frequency signify that the intensity of scene light changes in the course of an exposure. Also, if a sequence of recurrent signals is replaced by a continuous signal, the operator knows that the intensity of scene light has decreased below a value which is still satisfactory for proper exposures with automatic determination of exposure time.

The series of recurrent signals produced by a lamp in the testing circuit can be changed in a number of ways to indicate changes in light intensity during an exposure. For example, the signals may recur at identical intervals but are of different duration. Alternatively, the duration of each of a series of signals can remain the same but the frequency of signals changes to indicate changes in intensity of scene light. Furthermore, the testing circuit can change the frequency and duration of signals. This can be readily achieved by resorting to known electric circuits.

Figure 7:
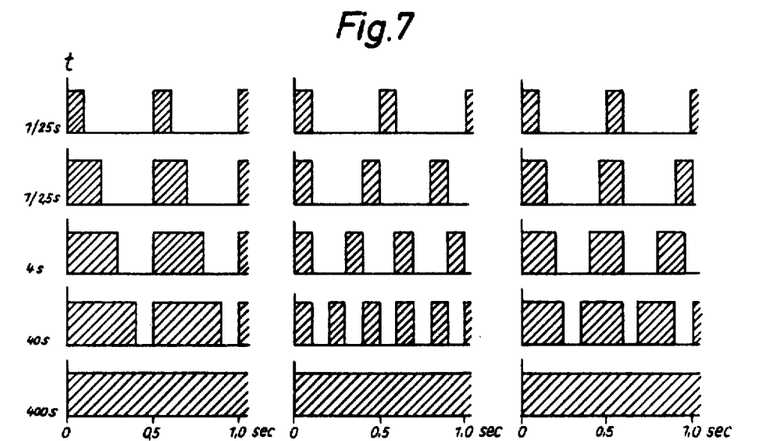
FIG. 7 is a diagram showing several types of signals which can be produced by the camera shown in FIG. 5 or 6.

FIG. 7 illustrates schematically the just described types of signals which can be produced by the signal generating means in a testing circuit. It is assumed that the shortest signal lasts for 0.1 second and indicates that exposure time (e.g., one twenty-fifth of a second) which is the limit at which a good photographer is still capable of making an exposure with hand-held camera. It is also assumed that the maximum exposure time which allows satisfactory exposures is 400 seconds.

The left-hand part of FIG. 7 illustrates changes in duration of successive signals in accordance with a logarithmic scale. The median part of FIG. 7 shows that the frequency of signals changes as a logarithmic scale but that the duration of signals remains unchanged. The right-hand part of FIG. 7 illustrates a further solution according to which the duration and frequency of signals change in accordance with a logarithmic scale. The duration and/or frequency of signals changes as a function of the intensity of scene light and enables the operator to determine the exposure time or to draw conclusions as to the approximate exposure time on short-lasting observation of signals. For example, the observation time need not exceed 1.5 seconds which is an important advantage of the just described embodiment. Furthermore, recurring signals are readily detectable by the user of the camera and can be easily interpreted to determine the exposure time with surprising accuracy.

Figure 8:
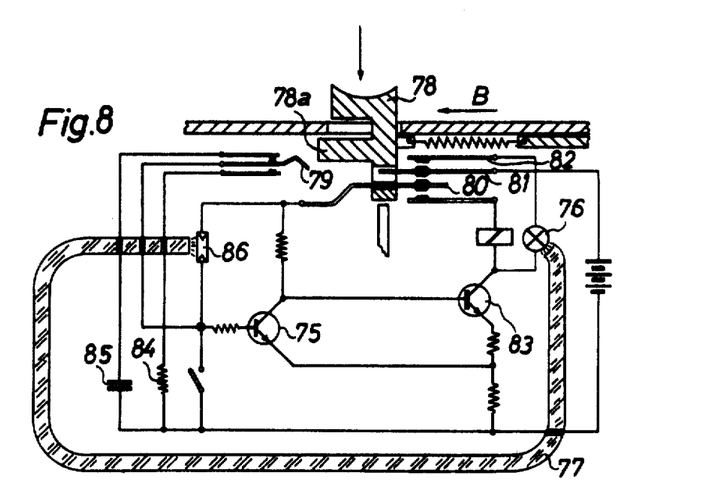
FIG. 8 is a fragmentary sectional view of a further camera which can produce recurrent signals to indicate a certain range of exposure times.

FIG. 8 illustrates a portion of a further camera wherein the oscillator circuit of FIGS. 5 and 6 is replaced by a simple optical feedback system. A resistor 84 which can be connected in place of the exposure time determining capacitor 85 causes a substantial change in operation of the circuit. This resistor 84 can be used with advantage in previously described embodiments, for example, in the circuits shown in FIGS. 1 and 2 to produce a single signal which is obtained when the exposure time is very short so that the operator is informed by the signal that the exposure time is short enough to permit making exposures with hand-held camera. It is not even necessary to disconnect the capacitor 85 when the resistor 84 is connected into the testing circuit. This resistor 84 constitutes with the light-sensitive resistor 86 of FIG. 8 a voltage divider and insures that the transistor 75 is controlled by the voltage at the ends of the resistor 84 when the actuating member or release trigger 78 changes the position of a two-way switch 79 in the testing circuit. Since the resistance of the light-sensitive receiver 86 depends on the intensity of scene light, the voltage at the resistor 84 increases with increasing light intensity and the resistance of the resistor 84 can be readily selected in such a way that the base-emitter potential of the transistor 75 reaches a predetermined value at the time when, e.g., the intensity of scene light is just sufficient to permit making exposures with hand-held camera.

Furthermore, and contrary to the operation of previously described testing circuits, light produced by the signal-generating lamp 76 can be conveyed through a light conductor 77 to impinge upon the light-sensitive resistor 86. When the trigger 78 is shifted in a direction to the left (arrow B) to determine the length of exposure time prior to making an exposure, the testing operation is carried out in the following sequence: The trip 78a of the trigger 78 disconnects the capacitor 85 by moving the median contact of the switch 79 away from the upper contact and against the lower contact to thereby connect the resistor 84 into the testing circuit. The trigger 78 also closes the master switch by moving the contact 80 against the contact 81 which moves against the contact 82. Disconnection of the capacitor 85 establishes a voltage divider including the resistors 84 and 86. The transistor 75 is blocked if the intensity of scene light is weak but the transistor 83 conducts current and the lamp 76 produces a continuous signal. If the intensity of scene light is high, the transistor 75 conducts but the transistor 83 blocks the flow of current so that the lamp 76 receives no current and produces no signal to thus inform the operator that the exposure can be made with hand-held camera.

Light produced by the lamp 76 is conveyed via conductor 77 and impinges upon the resistor 86 so that the latter's resistance decreases. The transistor 75 conducts current and the transistor 83 blocks the flow of current to terminate the visible signal. After a short interval which is determined by the inertia of parts, particularly by inertia of the resistor 86, the latter's resistance increases because the lamp 76 is off, and the entire cycle begins anew, i.e., the transistor 75 blocks and the transistor 83 conducts so that the lamp 76 lights up and illuminates the resistor 86 whose resistance decreases to terminate the signal. Thus, the circuit of FIG. 8 produces a sequence of recurrent signals by resorting to a very simple control system which need not utilize an oscillator circuit. The inertia of resistor 86, i.e., the time required by this resistor to react to a certain light impulse, depends on the preceding illumination which is produced by scene light when the lamp 76 is off. When the intensity of scene light is weak, inertia of the resistor 86 is higher so that the frequency of recurrent signals depends on intensity of scene light and the operator can calculate the exposure time by observing the frequency of recurrent signals. Also, the duration of individual signals is longer if the intensity of scene light is weaker.

It is further clear that the lamp 76 can be placed so close to the resistor 86 that the conductor 77 can be dispensed with. In such camera, the conductor 77 can be employed to convey light from the lamp 76 to the viewfinder so that the operator will detect visual signals even though the lamp is placed next to the light-sensitive resistor 86. Still further, the resistor 86 and lamp 76 can be placed so close to the viewfinder or to another window provided in the housing of the camera that the conductor 77 can be omitted because the signal produced by lamp 76 can be observed directly while light emitted by this lamp falls onto the light-sensitive surface of the resistor 86.

The improved camera is susceptible of many additional modifications without departing from the spirit of my invention. Thus, and as mentioned hereinbefore, the oscillator circuit of FIG. 5 or 6 can be replaced by other circuits which utilize different 1-C or even R-C elements, and the testing circuit may utilize different combinations of flip-flops or the like. The circuits may be of the integrated type and the features of individual embodiments may be combined or substituted for each other. Furthermore, the invention can be embodied in cameras whose exposure control employs a galvanometer or a circuit employing a galvanometer and electronic components. In each embodiment which employs two light-sensitive elements, such elements can be replaced by a differential light-sensitive receiver and the light-sensitive elements may be constituted by resistors, cells or other photosensitive devices.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desired to be protected by Letters Patent is set forth in the appended

1. In a photographic camera, a combination comprising shutter means movable between open and closed positions to provide a range of exposure times; release means operative to effect opening of said shutter means; an electric delay circuit for effecting closing of said shutter means following the operation of said release means and with a delay which is a function of the intensity of scene light; and indicating means including an electric testing circuit having signal-generating means for producing signals indicating the actual length of exposure time as a function of the intensity of scene light at least in a portion of said range and at least during the interval preceding an exposure.

2. A combination as defined in claim 1, said signal-generating means comprises means for producing signals whose frequency varies as a function of the intensity of scene light.

3. A combination as defined in claim 1, wherein said signal-generating means comprises means for producing signals whose duration varies as a function of the intensity of scene light.

4. A combination as defined in claim 1, wherein said signal-generating means comprises means for producing signals whose frequency and duration vary as a function of the intensity of scene light.

5. A combination as defined in claim 1, wherein said indicating means further comprises actuating means for energizing said testing circuit while the shutter means is closed.

6. A combination as defined in claim 5, wherein said actuating means constitutes said release means.

7. A combination as defined in claim 1, wherein said testing circuit is integrated into said delay circuit.

8. A combination as defined in claim 1, wherein said testing circuit further comprises proportioning means for determining the length of said signals so that such length is proportional to appropriate exposure time for a particular scene brightness.

9. A combination as defined in claim 8, wherein said proportioning means comprises means for effecting generation of signals which are shorter than the corresponding exposure times.

10. A combination as defined in claim 8, wherein said proportioning means comprises means for effecting generation of signals which are longer than the corresponding exposure times.

11. A combination as defined in claim 8, wherein said testing circuit comprises exposure time determining first capacitor means and said proportioning means comprises at least one second capacitor means whose capacitance is different from that of said first capacitor means, and selector means for substituting said second capacitor means for said first capacitor means.

12. A combination as defined in claim 1, wherein said signal-generating means comprises means for producing audible signals.

13. A combination as defined in claim 1, wherein said indicating means comprises control means for effecting generation of a sequence of recurring signals.

14. A combination as defined in claim 13, wherein said control means is arranged to effect generation of signals at a frequency which varies as a function of the intensity of scene light.

15. A combination as defined in claim 13, wherein said control means is arranged to effect generation of signals whose duration varies as a function of the intensity of scene light.

16. In a photographic camera, a combination comprising shutter means movable between open and closed positions to provide a range of exposure times; release means operative to effect opening of said shutter means; an electric delay circuit for effecting closing of said shutter means with a variable delay following operation of said release means, said delay circuit comprising light-sensitive receiver means, exposure time determining capacitor means which is charged through said receiver means, a flip-flop which detects the charge of said capacitor means, and electromagnet means which effects closing of said shutter means in response to interruption of current supply thereto by said flip-flop when the charge of said capacitor means rises to a predetermined value; and indicating means including an electric testing circuit integrated into said delay circuit and having signal-generating means for producing signals indicating the length of exposure time at least in a portion of said range as a function of the intensity of scene light, said testing circuit further having master switch means for connecting said signal-generating means into said delay circuit in lieu of said electromagnet means so that said signal-generating means produces signals of a duration corresponding to the interval during which said electromagnet means is energized at a given light intensity, said release means being movable from a starting position in a first direction to open said shutter means and to complete said delay circuit with resulting energization of said electromagnet means for an interval of time which is a function of the intensity of scene light detected by said receiver means, and in a second direction to complete said testing circuit and to connect said signal-generating means in said delay circuit in lieu of said electromagnet means so that said signal-generating means produces a signal whose duration is a function of said intensity as detected by said receiver means.

17. A combination as defined in claim 16, further comprising housing means supporting said release means, and guide means provided on said housing means to prevent movement of said release means in said second direction after said release means leaves said starting position in said first direction, and vice versa.

18. In a photographic camera, a combination comprising shutter means movable between open and closed positions to provide a range of exposure times; release means operative to effect opening of said shutter means; an electric delay circuit for effecting closing of said shutter means with a variable delay following the operation of said release means; and indicating means including an electric testing circuit having signal-generating means for producing signals indicating the length of exposure time at least in a portion of said range as a function of the intensity of scene light, said testing circuit further having auxiliary elements connected in parallel and/or series with said signal-generating means to suppress the signal at a predetermined range of light intensities.

19. In a photographic camera, a combination comprising shutter means movable between open and closed positions to provide a range of exposure times; release means operative to effect opening of said shutter means; an electric delay circuit for effecting closing of said shutter means with a variable delay following the operation of said release means; and indicating means including an electric testing circuit having signal-generating means for producing signals indicating the length of exposure time at least in a portion of said range as a function of the intensity of scene light, said testing circuit further having exposure time determining first capacitor means and proportioning means for determining the length of said signals so that such length is proportional to appropriate exposure time for a particular scene brightness, said proportioning means comprising a plurality of second capacitor means whose capacitance is different from that of said first capacitor means, selector means for substituting a selected one of said second capacitor means for said first capacitor means, said selector means being movable to and from an idle position in which said first capacitor means is connected in said testing circuit, and resetting means for moving said selector means to idle position in response to operation of said release means.

20. In a photographic camera, a combination comprising shutter means movable between open and closed positions to provide a range of exposure times; release means operative to effect opening of said shutter means; an electric delay circuit for effecting closing of said shutter means with a variable delay following the operation of said release means; and indicating means including an electric testing circuit having signal-generating means for producing signals indicating the length of exposure time at least in a portion of said range as a function of the intensity of scene light and control means for effecting the generation of a sequence of recurring signals, said signal-generating means comprising a lamp and said control means comprising a light-sensitive receiver exposed to scene light and means for directing light emitted by said lamp against said receiver.

21. In a camera, automatic exposure time determining means, photosensitive resistor means for receiving light the intensity of which corresponds to the intensity of light of an object which is to be photographed, exposure time circuit means operatively connected between said photosensitive resistor means and said exposure time determining means for actuating the latter in accordance with the intensity of light received by said photosensitive resistor means, a signal lamp, signal circuit means including a plurality of transistors and operatively connected between said photosensitive resistor means and said signal lamp for energizing the latter when the light received by said photosensitive resistor means is within a given range of light intensity at intervals determined by the intensity of light within said range so as to provide at said lamp a blinking signal the frequency of which is indicative of the light intensity and thus indicative of the exposure time, and means coacting with said signal circuit means to provide through said signal circuit means at said lamp a blinking frequency determined by the light intensity within said range and an additional factor, said photosensitive resistor means including only a single photosensitive resistor which coacts both with said signal circuit means in the control of said signal lamp and with said exposure time circuit means in the control of said automatic exposure time determining means.

22. The combination of claim 21 and wherein said signal circuit means coacts with said lamp for illuminating the latter at intervals providing a relatively low blinking frequency at relatively long exposure times and a relatively high blinking frequency at relatively short exposure times.